United States Patent [19]

Clouse

[11] Patent Number: 5,490,686
[45] Date of Patent: Feb. 13, 1996

[54] OSCILLATING LEVER HAND PROPELLED VEHICLE

[76] Inventor: Gern J. Clouse, 3150 S. Sagamont Dr., #131, Springfield, Mo. 65807

[21] Appl. No.: 391,525

[22] Filed: Feb. 21, 1995

[51] Int. Cl.⁶ .................................................... B62M 1/16
[52] U.S. Cl. .......................... 280/247; 280/231; 280/240; 280/256
[58] Field of Search ................................. 280/230, 231, 280/240, 242.1, 244, 247, 252, 253, 256; 105/86, 87, 88, 89

[56] References Cited

U.S. PATENT DOCUMENTS

| 617,344 | 1/1899 | Milliron | 105/88 |
|---|---|---|---|
| 726,001 | 4/1903 | Smith | 280/240 |
| 1,234,614 | 7/1917 | Bordner et al. | 280/240 |
| 1,723,553 | 8/1929 | Lundahl | 280/240 |
| 2,892,638 | 6/1959 | Stadden | 280/231 |
| 3,336,047 | 8/1967 | Burgess | 280/240 |

*Primary Examiner*—Kevin T. Hurley

[57] ABSTRACT

A vehicle for converting oscillating human motion into linear vehicular translation. The inventive device includes a frame having first and second pairs of driving wheels rotatably mounted thereto. A pair of center wheels projects from the frame between the pairs of driving wheels to support the frame in conjunction with only one of the pairs of driving wheels. A propulsion and steering assembly mounted to the frame converts a manual pivoting movement of a lever arm about a horizontal axis into rotational torque applied to the driving wheels and further converts a manual pivoting of the lever arm about a vertical axis into steering of the center wheels to control the vehicle.

5 Claims, 4 Drawing Sheets

OSCILLATING LEVER HAND PROPELLED VEHICLE

BACKGROUND OF THE INVENTION

1. Field of the Invention

The present invention relates to manually propelled vehicles and more particularly pertains to an oscillating lever hand propelled vehicle for converting oscillating human motion into linear vehicular translation.

2. Description of the Prior Art

The use of manually propelled vehicles is known in the prior art. More specifically, manually propelled vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art manually propelled vehicles include U.S. Pat. Nos. 5,284,355; 5,242,181; 5,098,114; 4,976,451; and 4,705,284.

While these devices fulfill their respective, particular objectives and requirements, the aforementioned patents do not disclose an oscillating lever hand propelled vehicle for converting oscillating human motion into linear vehicular translation which includes a frame having first and second pairs of driving wheels rotatably mounted thereto, a pair of center wheels projecting from the frame between the pairs of driving wheels, and a propulsion and steering assembly mounted to the frame for converting a manual pivoting movement of a lever arm about a horizontal axis into rotational torque applied to the driving wheels and further for converting a manual pivoting of the lever arm about a vertical axis into steering of the center wheels to control the vehicle.

In these respects, the oscillating lever hand propelled vehicle according to the present invention substantially departs from the conventional concepts and designs of the prior art, and in so doing provides an apparatus primarily developed for the purpose of converting oscillating human motion into linear vehicular translation.

SUMMARY OF THE INVENTION

In view of the foregoing disadvantages inherent in the known types of manually propelled vehicles now present in the prior art, the present invention provides a new oscillating lever hand propelled vehicle construction wherein the same can be utilized to propel a human relative to a ground surface. As such, the general purpose of the present invention, which will be described subsequently in greater detail, is to provide a new oscillating lever hand propelled vehicle apparatus and method which has many of the advantages of the manually propelled vehicles mentioned heretofore and many novel features that result in an oscillating lever hand propelled vehicle which is not anticipated, rendered obvious, suggested, or even implied by any of the prior art manually propelled vehicles, either alone or in any combination thereof.

To attain this, the present invention generally comprises a vehicle for converting oscillating human motion into linear vehicular translation. The inventive device includes a frame having first and second pairs of driving wheels rotatably mounted thereto. A pair of center wheels projects from the frame between the pairs of driving wheels to support the frame in conjunction with only one of the pairs of driving wheels. A propulsion and steering assembly mounted to the frame converts a manual pivoting movement of a lever arm about a horizontal axis into rotational torque applied to the driving wheels and further converts a manual pivoting of the lever arm about a vertical axis into steering of the center wheels to control the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oscillating lever hand propelled vehicle apparatus and method which has many of the advantages of the manually propelled vehicles mentioned heretofore and many novel features that result in an oscillating lever hand propelled vehicle which is not anticipated, rendered obvious, suggested, or even implied by any of the prior art manually propelled vehicles, either alone or in any combination thereof.

It is another object of the present invention to provide a new oscillating lever hand propelled vehicle which may be easily and efficiently manufactured and marketed.

It is a further object of the present invention to provide a new oscillating lever hand propelled vehicle which is of a durable and reliable construction.

An even further object of the present invention is to provide a new oscillating lever hand propelled vehicle which is susceptible of a low cost of manufacture with regard to both materials and labor, and which accordingly is then susceptible of low prices of sale to the consuming public, thereby making such oscillating lever hand propelled vehicles economically available to the buying public.

Still yet another object of the present invention is to provide a new oscillating lever hand propelled vehicle which provides in the apparatuses and methods of the prior art some of the advantages thereof, while simultaneously overcoming some of the disadvantages normally associated therewith.

Still another object of the present invention is to provide a new oscillating lever hand propelled vehicle for converting oscillating human motion into linear vehicular translation.

Yet another object of the present invention is to provide a new oscillating lever hand propelled vehicle which includes a frame having first and second pairs of driving wheels rotatably mounted thereto, a pair of center wheels projecting from the frame between the pairs of driving wheels, and a propulsion and steering assembly mounted to the frame for converting a manual pivoting movement of a lever arm about a horizontal axis into rotational torque applied to the driving wheels and further for converting a manual pivoting of the lever arm about a vertical axis into steering of the center wheels to control the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
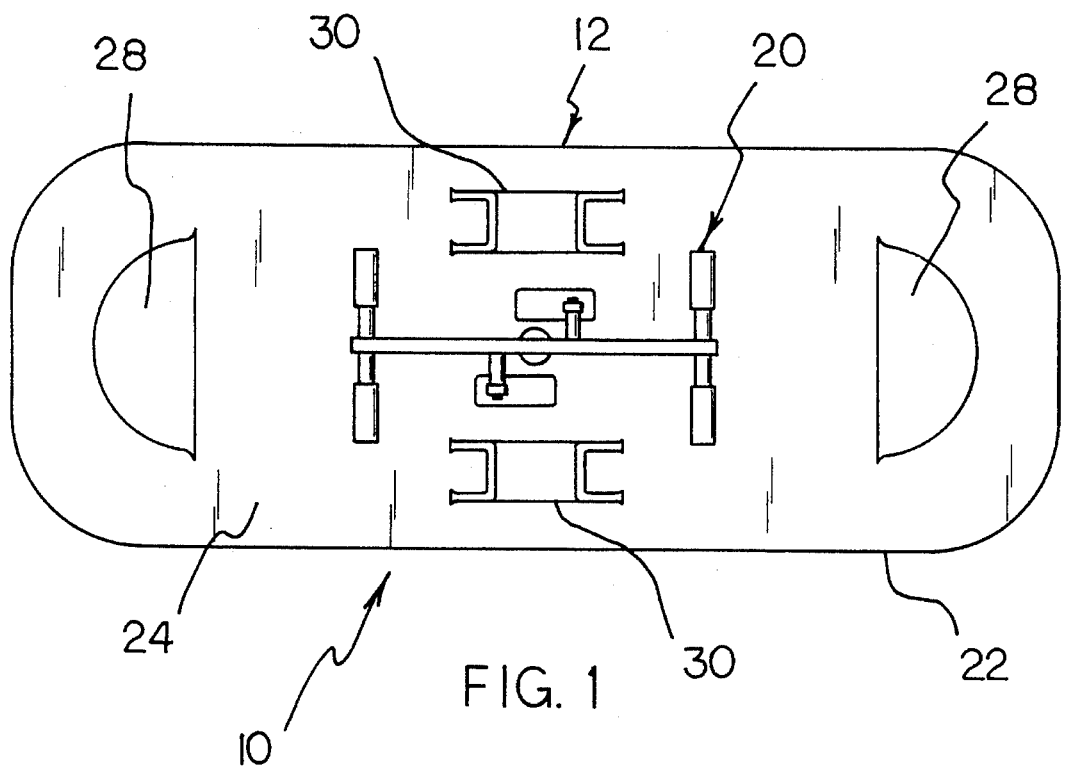
FIG. 1 is a top plan view of an oscillating lever hand propelled vehicle according to the present invention.

With reference now to the drawings, and in particular to FIGS. 1–7 thereof, a new oscillating lever hand propelled vehicle embodying the principles and concepts of the present invention and generally designated by the reference numeral 10 will be described.

Figure 2:
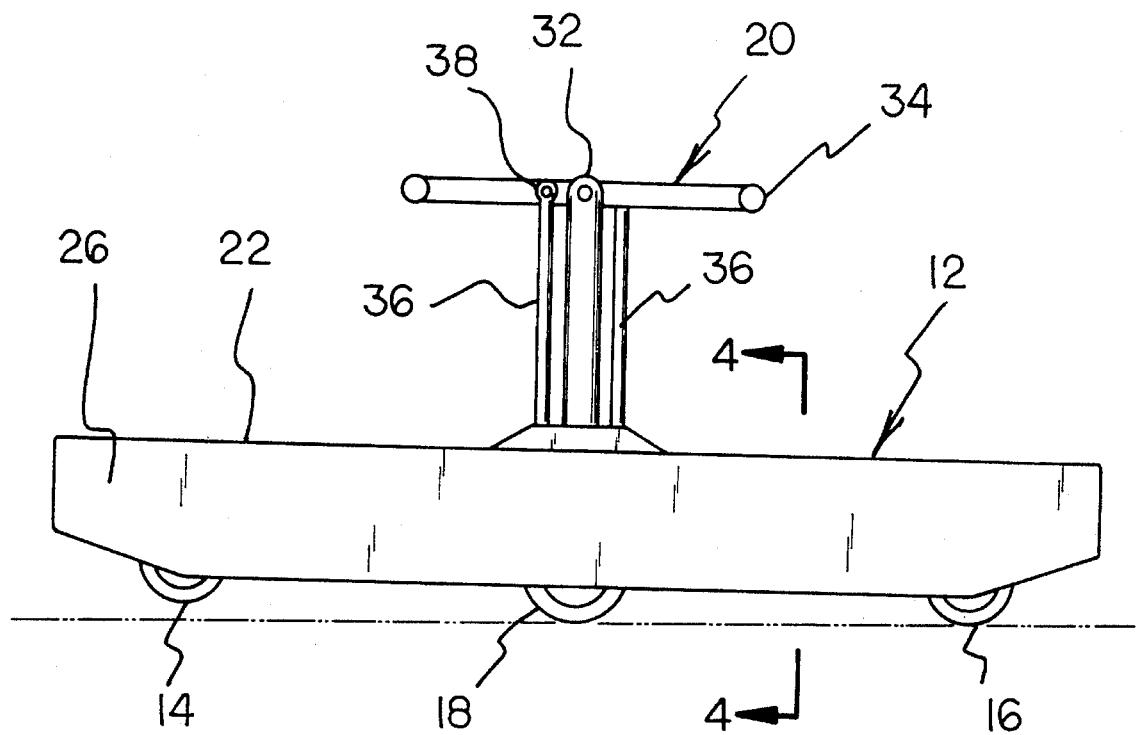
FIG. 2 is a side elevation view thereof.
Figure 3:
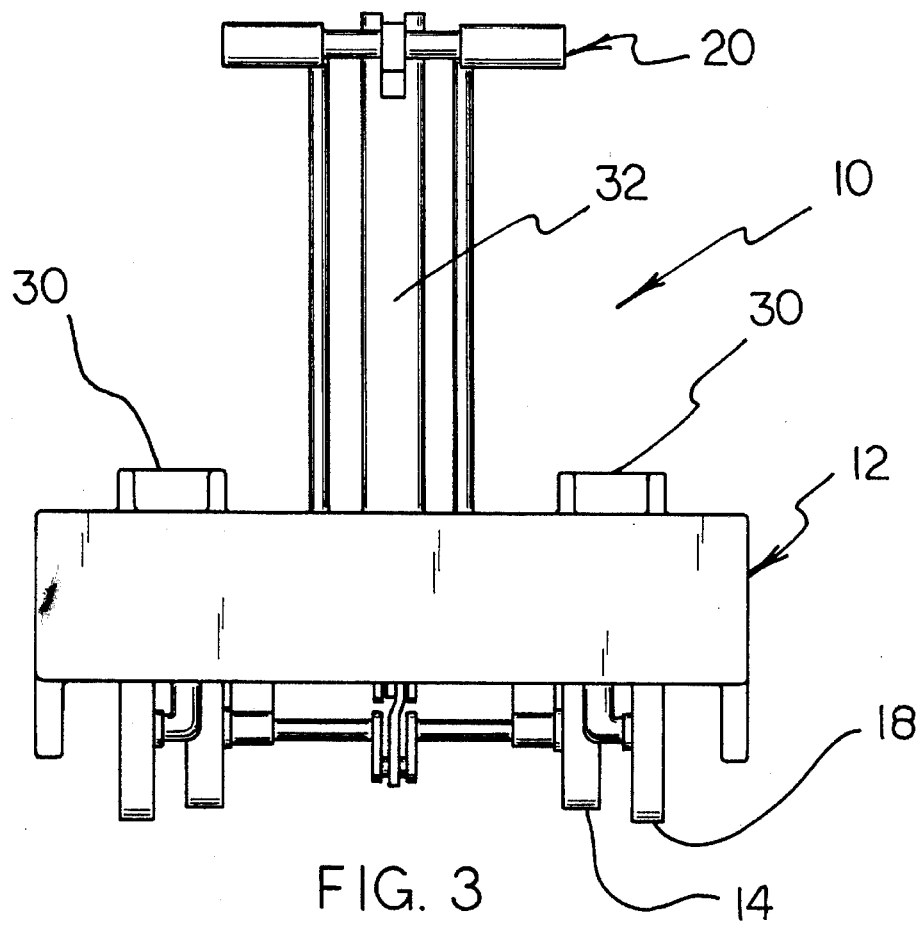
FIG. 3 is an end elevation view of the present invention.

More specifically, it will be noted that the oscillating lever hand propelled vehicle 10 comprises a frame 12 having a first pair of drive wheels 14 rotatably mounted thereto about a horizontal axis, and a second pair of drive wheels 16 similarly rotatably mounted to the frame about a horizontal axis extending therethrough, as shown in FIG. 2. A pair of center wheels 18 is mounted to the frame 12 and positioned between the first and second pair of drive wheels 14 and 16. The center wheels 18 project from the frame 12 a first distance, with the drive wheels 14 and 16 projecting from the frame 12 a second distance, wherein the first distance is substantially greater than the second distance such that the center wheels 18 support the frame 12 relative to an unlabelled ground surface in conjunction with only one of the pairs of drive wheels 14 or 16. A propulsion and steering means 20 is mounted to the frame 12 for converting oscillating human motion into rotational torque outputted through the drive wheels 14 and 16 and further for converting pivoting human motion into rotation of the center wheels 18 about a vertical axis to steer the vehicle 10. By this structure, one or more individuals can reside upon the frame 12 and operate the propulsion and steering means 20 to effect acceleration and steering of the vehicle 10.

As best illustrated in FIGS. 1 and 2, it can be shown that the frame 12 according to the present invention 10 comprises a substantially rectangular vehicle body 22 including a planar top wall 24 having a depending perimeter side wall 26 extending therearound. The planar top wall 24 is shaped so as to define a pair of seat depressions 28 located proximal to respectively opposed ends of the vehicle body 22 within which one or more individuals utilizing the device 10 can reside. A pair of foot rests 30 are mounted proximal to a center of the planar top wall 24 of the vehicle body 22 and serve to receive and support feet of one or more individuals operating the device 10. As shown in FIG. 2, the center wheels project beyond the drive wheels 14 and 16 such that the frame 12 is supported by the center wheels and only one pair of drive wheels 14 or 16 at any one time. Thus, when a single individual is utilizing the device 10 the frame 12 will pivot the pair of drive wheels 14 or 16 into contact with the ground surface therebeneath on the side of the frame 12 which the individual is residing. When two individuals are residing on top of the frame 12 during use of the device 10, the frame will pivot the pair of drive wheels 14 or 16 residing beneath the heavier individual. Further, it should be noted that the individuals residing on the frame 12 can control pivoting of the frame about the center wheels 18 by shifting the distance between each individual and the center wheels in a readily apparent manner. By this structure, the device 10 can be steered into either direction relative to a fixed angular orientation of the center wheels 18 by simply pivoting the frame 12 so as to position either pair of the drive wheels 14 or 16 into contact with the ground surface therebeneath. In other words, with the center wheels 18 angled to the right with the first pair of drive wheels 14 engaged to the ground surface, for example, the vehicle will turn to the right. However, should the frame 12 be pivoted about the center wheels such that the second pair of drive wheels 16 is caused to engage the ground surface with the center wheels 18 still angled to the right, the device will then turn to the left.

Figure 7:
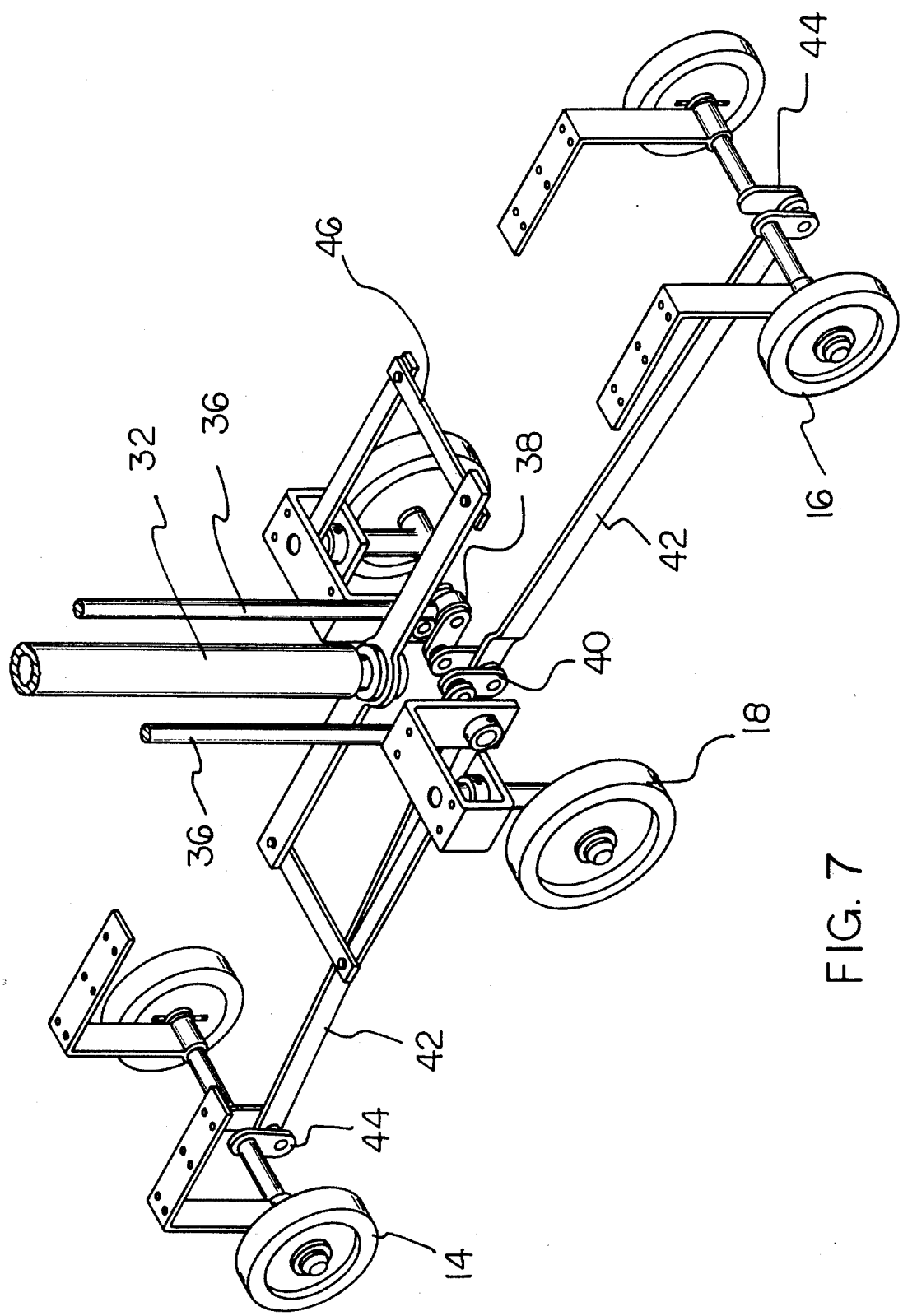
FIG. 7 is an isometric illustration of a propulsion and steering means according to the present invention.

Referring now to FIGS. 3 through 7, it can be shown that the propulsion and steering means 20 according to the present invention comprises a center stanchion 32 projecting substantially orthogonally from the planar top wall 24 of the vehicle body 20 and rotatably mounted relative to the frame 12. A propulsion handle 34, as best illustrated in FIG. 2, is pivotally mounted to the center stanchion 32 so as to extend parallel to a longitudinal length of the vehicle body 22. A pair of push rods 36 are pivotally and rotatably mounted to the propulsion handle 34 by ball joints 38 and are similarly pivotally and rotatably mounted by further ball joints 38 (see FIG. 6) to a driving crank 40 rotatably mounted to the frame 12. By this structure, an oscillation of the propulsion handle 34 by an individual or individuals utilizing the device 10 will effect rotation of the driving crank 40 relative to the frame 12. As best illustrated in FIG. 7, a pair of oscillating rods 42 are rotatably mounted to the driving crank 40 and extend in opposed directions to couple with axle cranks 44 rotatably supporting the first and second drive wheels 14 and 16 respectively. By this structure, a rotation of the driving crank 40 as described above will effect back and forth movement of the oscillating rods 42 which is converted into rotational motion of the drive wheels 14 and 16 by the axle cranks 44.

Figure 4:
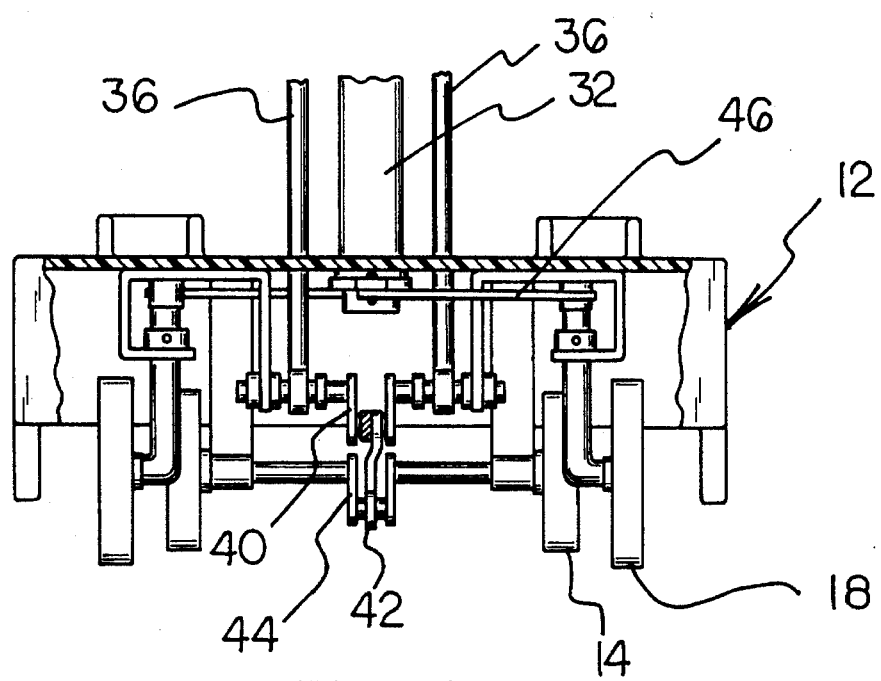
FIG. 4 is an end elevation view, partially in cross-section of the invention.
Figure 5:
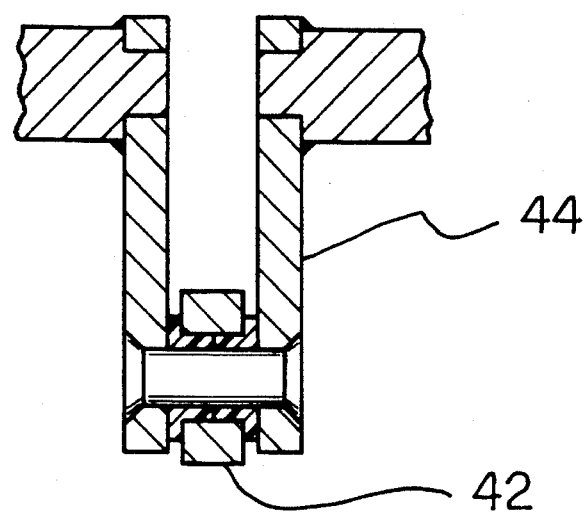
FIG. 5 is a cross-sectional view of an axle crank of the invention.
Figure 6:
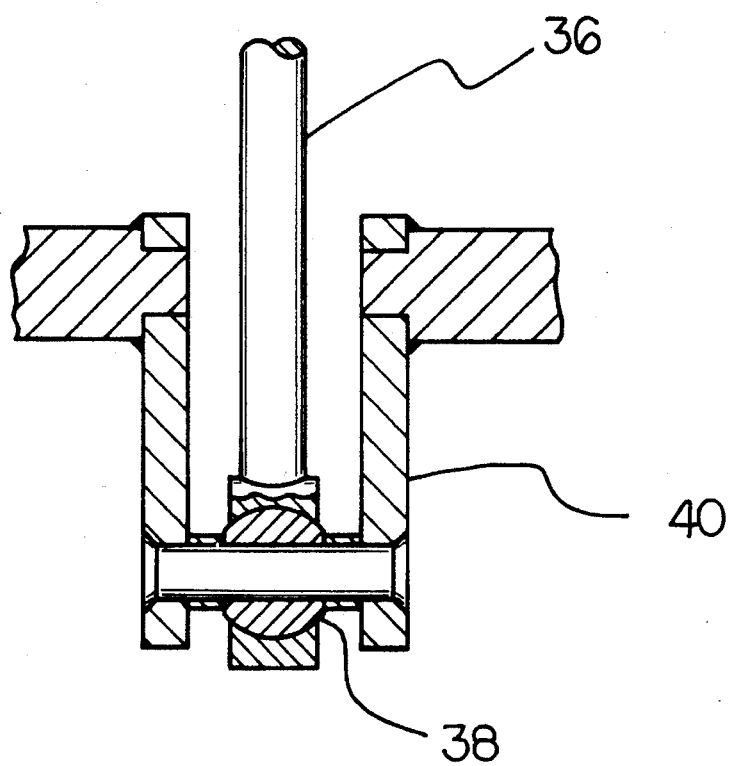
FIG. 6 is a cross-sectional view of a driving crank and ball joint of the present invention.

As best illustrated in FIGS. 4 and 7, it can be shown that the center wheels 18 are rotatably mounted relative to the frame 12 about both horizontal and vertical axis and are coupled to the center stanchion 32 by a steering linkage 46. The steering linkage operates to convert rotational motion of the center stanchion 32 about a vertical axis into steering motion of the center wheels 18. Thus, an oscillation of the propulsion handle 34 about a horizontal axis will effect oscillating movement of the push rods 36 and the oscillating rods 42 to propel the vehicle, with a rotation of the propulsion handle 34 about a vertical axis directed through a longitudinal length of the center stanchion 32 will effect steering of the center wheels 18 to control the vehicle 10.

In use, the oscillating lever hand propelled vehicle 10 according to the present invention can be easily utilized by one or more individuals to convert oscillating human motion into linear vehicular translation so as to transport such individuals relative to an unlabelled ground surface. Further, the device can be steered through a variety of methods including a simple rotation of the propulsion handle 34, or alternatively, through a rotation of the propulsion handle and concurrent pivoting of the frame 12 about the center wheels 18 as described above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An oscillating lever hand propelled vehicle comprising:

a frame having a first pair of drive wheels rotatably mounted thereto about a horizontal axis, and a second pair of drive wheels similarly rotatably mounted to the frame about a horizontal axis extending therethrough;

a pair of center wheels mounted to the frame and positioned between the first and second pair of drive wheels;

a propulsion and steering means mounted to the frame for converting oscillating human motion into rotational torque outputted through the drive wheels and further for converting pivoting human motion into rotation of the center wheels about a vertical axis to steer the vehicle.

2. The oscillating lever hand propelled vehicle of claim 1, wherein the center wheels projecting from the frame a first distance, with the drive wheels projecting from the frame a second distance, wherein the first distance is substantially greater than the second distance such that the center wheels support the frame relative to a ground surface in conjunction with only one of the pairs of drive wheels.

3. The oscillating lever hand propelled vehicle of claim 2, wherein the frame comprises a substantially rectangular vehicle body including a planar top wall having a depending perimeter side wall extending therearound; the planar top wall being shaped so as to define a pair of seat depressions located proximal to respectively opposed ends of the vehicle body within which individuals can reside.

4. The oscillating lever hand propelled vehicle of claim 3, wherein the propulsion and steering means comprises a center stanchion projecting substantially orthogonally from the planar top wall of the vehicle body and rotatably mounted relative to the frame; a propulsion handle pivotally mounted to the center stanchion so as to extend parallel to a longitudinal length of the vehicle body; a pair of push rods pivotally and rotatably mounted to the propulsion handle; a driving crank rotatably mounted to the frame, the push rods being coupled to the driving crank being such that an oscillation of the propulsion handle will effect rotation of the driving crank relative to the frame; a pair of oscillating rods rotatably mounted to the driving crank and extending in opposed directions; a first axle crank rotatably supporting the first drive wheel; a second axle crank rotatably supporting the second drive wheel, the oscillating rods being coupled to the axle cranks such that a rotation of the driving crank will effect reciprocating movement of the oscillating rods which is converted into rotational motion of the drive wheels by the axle cranks.

5. The oscillating lever hand propelled vehicle of claim 4, wherein the center wheels are rotatably mounted relative to the frame about both horizontal and vertical axis and are coupled to the center stanchion by a steering linkage means for converting rotational motion of the center stanchion about a vertical axis into steering motion of the center wheels.

* * * * *